Figure 1:
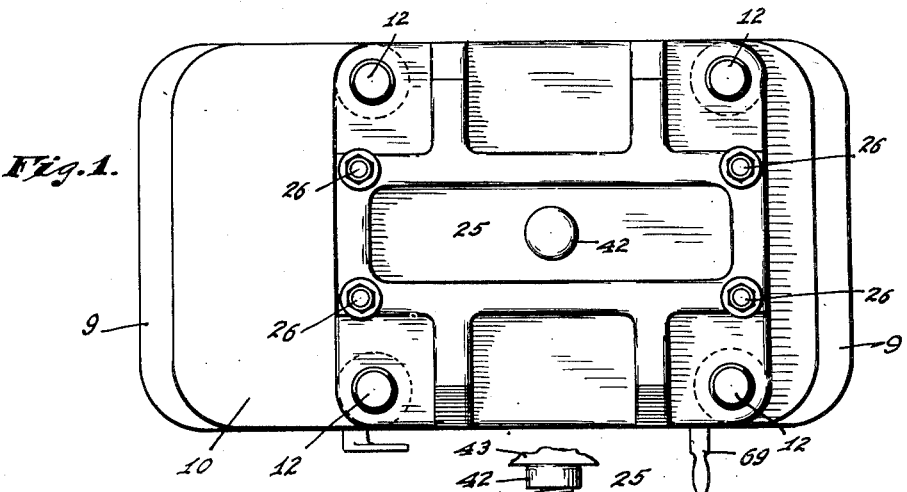

Feb. 24, 1953 W. O. HARTUP 2,629,439
TRIMMING MACHINE
Filed Feb. 28, 1949 3 Sheets-Sheet 1

INVENTOR.
WILLIAM O. HARTUP,
BY
Schley, Drach & Jenkins
ATTORNEYS.

Feb. 24, 1953 — W. O. HARTUP — 2,629,439
TRIMMING MACHINE
Filed Feb. 28, 1949 — 3 Sheets-Sheet 2

INVENTOR.
William O. Hartup
BY Schley, Nash & Jenkins
ATTORNEYS.

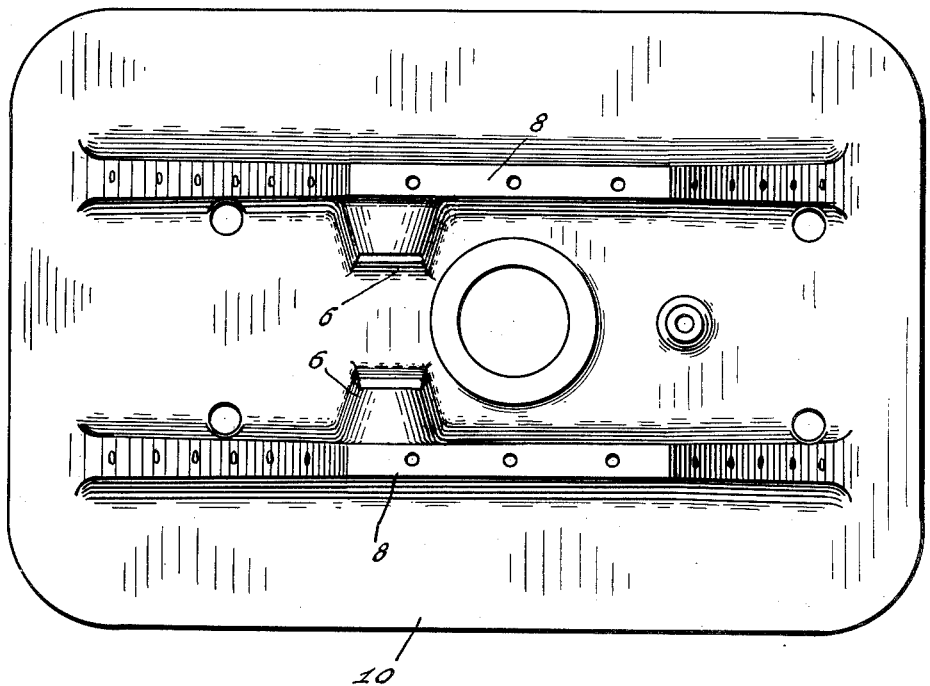

Patented Feb. 24, 1953

2,629,439

UNITED STATES PATENT OFFICE 2,629,439

TRIMMING MACHINE

William O. Hartup, Columbus, Ind.

Application January 28, 1949, Serial No. 73,326

11 Claims. (Cl. 164—47)

This invention relates to a machine for operating upon sheet-metal stampings, especially for trimming the walls of drawn parts. The machine of this invention is an improvement of the machine shown in my co-pending application Serial No. 709,055, filed November 9, 1946, now Patent No. 2,521,974.

Many sheet-metal parts, after being drawn or formed to their desired shape, then have their side walls trimmed to provide edges of a desired contour, which may be a continuous edge in a flat or curved plane, or may include notches or upstanding tabs. Supplementary cutting and forming operations may also be done at or adjacent the trimmed edge, by providing the trimming dies with suitable parts for this purpose.

It is my general object to produce a machine for this purpose which will be self-contained, simple in construction and operation, and efficient in producing high quality work. It is a special object of this invention to provide such a machine which will be sturdy and capable of sustained operation over long periods, even on relatively heavy gage stampings. It is a further object to provide in such a machine a power train which is short and direct and of few parts, and which is compactly arranged. It is a further object to provide such a power train which will facilitate construction of a machine having adequate strength and in which distortion is avoided, without excessive weight.

In a machine embodying my invention, assuming it to have a horizontal table, the upper one of a pair of dies is mounted on a carrier which positions it in proper relation with a lower movable die, and which may be raised to open the dies. The lower movable die is mounted on a horizontally movable die plate, and the work of the dies is effected by such horizontal movement of the lower die. The lower die is mounted on a die plate which is supported on a generally annular carrier slidably mounted on the surface of a table and suitably held thereagainst for limited sliding movement on that table; and the carrier is both operated and guided by a cam and guiding thrust members which are mounted and work within the annulus of the carrier.

In accordance with my present invention, the inner ends of the guiding thrust members carry renewable cam rolls to engage the operating cam head, and such cam is carried on the upper end of a heavy short drive shaft journaled on a central vertical axis in the table. The cam head has a single radially adjustable and renewable cam segment and a relief at a point diametrically opposite the cam segment, and has intervening cylindrical surfaces to engage the guiding thrust members in a normal at-rest position in which they position the die plate centrally. Upon rotation of the main shaft through a single revolution, the cam segment engages the cam rolls of the thrust members in circumferential succession, and the die plate is given a series of radial rectilinear movements and returns to center position after each of such movements. Each such movement is effected by thrust through one of the guiding thrust members, while its opposite thrust member retracts into the cam relief, and is guided by others of the guiding thrust members.

Preferably, the table is reinforced by depending longitudinal ribs joined at their lower edges by a bridge wall parallel with the table, to form a rigid box-section structure adjacent the main shaft, which is journaled at its upper end in the table and further supported at its lower end by a bearing in the bridge wall. Between the two bearings the shaft carries a one-revolution clutch, the driving member of which is directly driven by speed reduction gearing, conveniently a single worm and ring gear, mounted in the same box-section structure.

Figure 2:
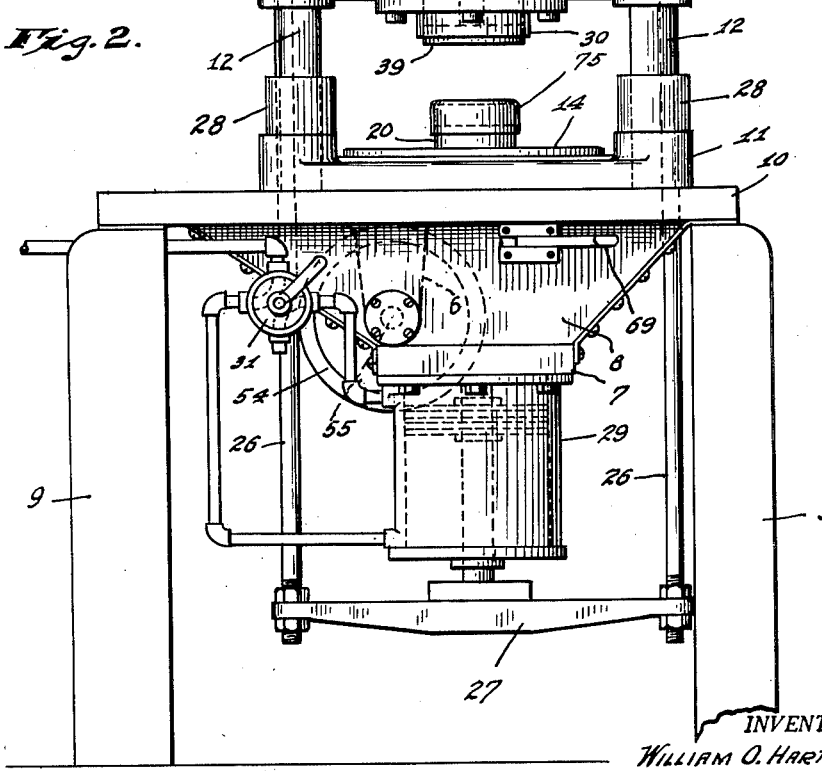
Figure 3:
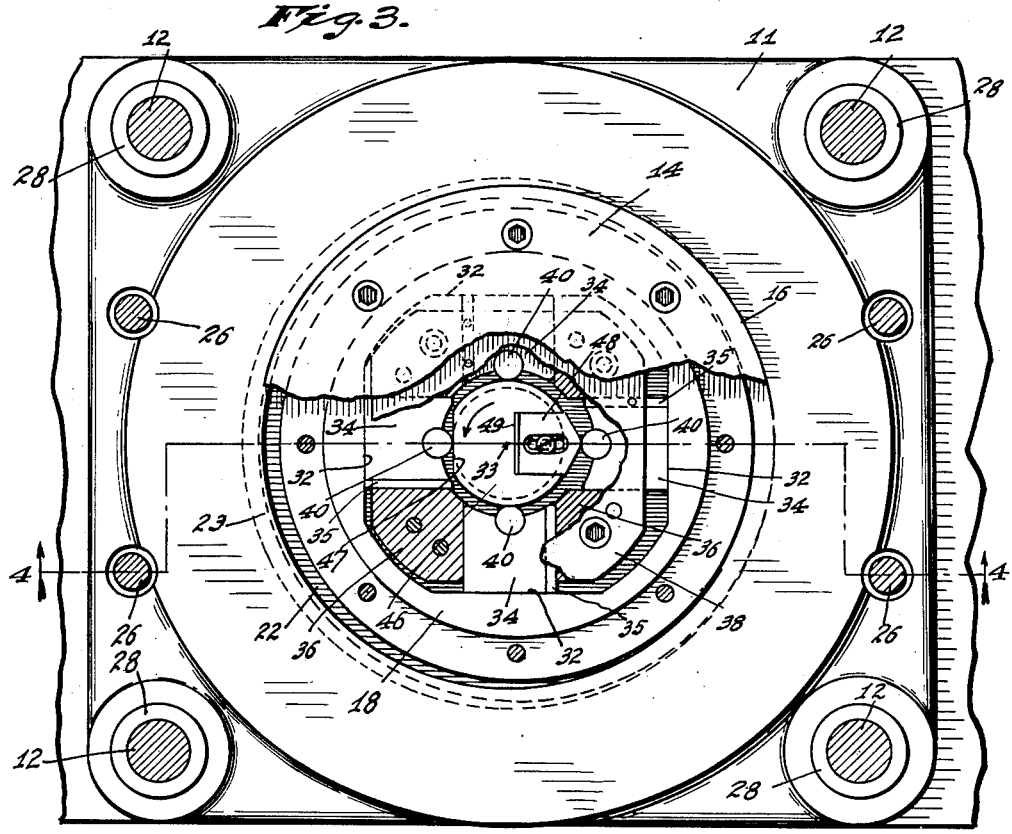
Figure 4:
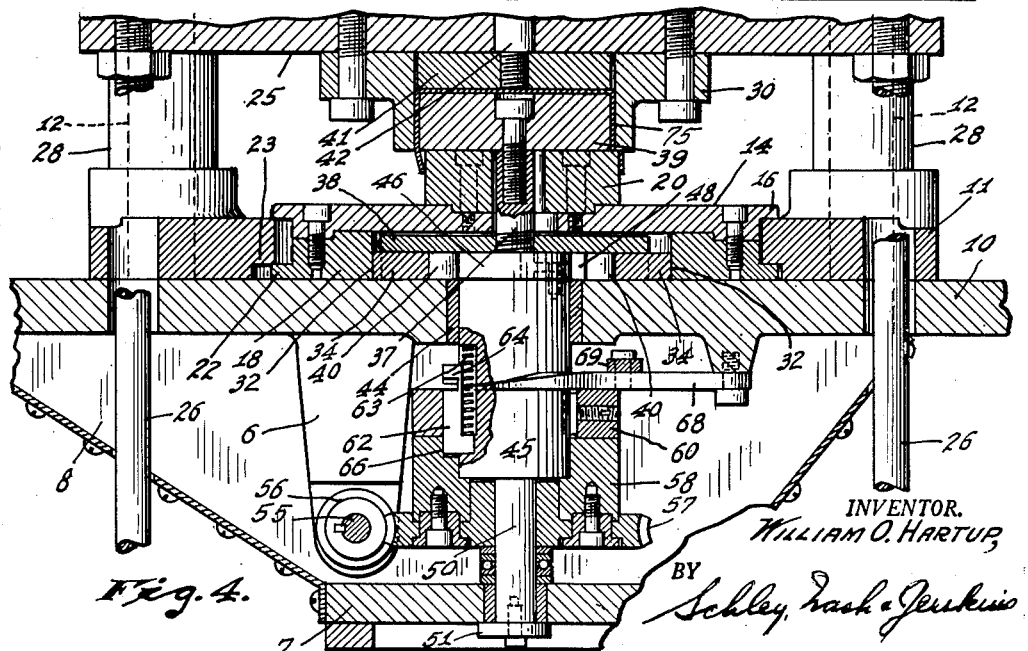

The accompanying drawings illustrate my invention:

In such drawings, Fig. 1 is a top plan view of a machine embodying my invention; Fig. 2 is a front elevation of the machine shown in Fig. 1; Fig. 3 is a horizontal section showing the die carrier and table in plan, and with parts broken away to show the operating mechanism; Fig. 4 is a vertical central section on the line 4—4 of Fig. 3, and Fig. 5 is a bottom plan of the table structure.

The machine shown in the drawings comprises a table 10 supported at its ends on legs 9. The table 10 is formed by a top slab reinforced by longitudinal depending walls 8 integral therewith and spaced from each other a distance equal to about half the width of the table, and joined at the bottom by a bridge wall 7. This assembly is further reinforced by a pair of vertical ribs 6 extending toward each other from the inner faces of the walls 8 and formed at their lower ends to receive the bearings of the driving shaft. Such construction forms an exceptionally rigid table and provides bearing support for the several parts of the driving train, as will appear below. The inclined ends of the walls 8 are desirably closed by suitable plates, to enclose the driving mechanism and permit it to operate in a bath of oil.

Upon the table 10 there is mounted a head 11 having vertical guide posts 12 at its corners. A die plate 14 is mounted on the table 10 within the bed 11, and carries the lower trimming die 20.

A cross head 25 vertically movable on the guide posts 12, carries the upper trimming die 30. Such die 30 has a work-receiving opening, in the bottom of which there is a knock-out block 41, carried by a bar 42 vertically movable in the cross head 25 and spring pressed upward. An actuating stop 43 is positioned to engage the bar 42 as the cross head rises.

The cross head 25 is connected by vertical rods 26 to a lower cross head 27, and this is connected to operating mechanism, so that the cross head 25 may be elevated to open the dies for loading, and lowered to bring the two trimming dies to proper working relation. The limit of lowering may be determined by stop sleeves 28 on the guide posts 12. Raising and lowering of the head 25 may be done by any convenient power device, shown for convenience here as an air operated power cylinder 29 controlled by a manually operated four-way valve 31.

The die plate 14 is mounted within a circular opening in the bed 11 and desirably has a rim 16 which overlies the edges of that opening. It is removably secured to a generally annular carrier 18 which slides on the surface of the table 10 and is provided with a lower rim 22 which slides under a shoulder 23 on the bed 11.

The inner surface of the carrier 18 forms four planar guiding thrust faces 32 which are perpendicular to the surface of the table 10 and to radii from a central vertical axis 33. Each of the faces 32 is abutted by a guiding thrust member 34. These slide on the table and are held to radial movement by guide blocks 36. A plate 38 overlies the four guiding thrust members 34 beneath the die plate 14, and is fixed on the four guide blocks 36. A stud 37 is mounted on the fixed plate 38 and extends up through central openings in the die plate 14 and die 20 to support a holder block 39 for the work piece on top of the die 20.

The inner ends of the four guiding thrust members 34 are each formed with a vertical cylindrical slot to receive and hold a thrust roll 40, which desirably has a bearing fit in the guiding thrust member 34 so that it may turn therein to prevent localization of wear.

The heavy main shaft 45 is journaled in a bearing 44 in the table 10, and has an enlarged cam head 46 at its upper end, which bears against the top of the bearing 44 and is positioned in the plane of the thrust rolls 40. At one side, the cam head 46 has a radial slot to receive a replaceable cam segment 48 held therein by a cap screw. The cam segment 48 is adjustable in the slot, and may be removed and reground as necessary, and is desirably backed up by one or more shims 49. Diametrically opposite the cam segment 48, the cam head 46 is cut away to provide a cam relief 47, and between the cam segment 48 and the relief 47 the surfaces of the cam head 46 are cylindrical and of a diameter which will engage the thrust rolls 40 to hold the guiding thrust members 34 in guiding relationship with the guiding thrust faces 32 of the carrier 18.

The shaft 45 and the cam head 46 as shown in Fig. 3 rotate counter-clockwise during successive cycles of operation, and under such circumstances wear on the guiding thrust members 34 occurs largely on their counter-clockwise sides. To compensate for such wear, the four guiding thrust members are each provided on such sides with removable wear plates 35. Such wear plates 35, the thrust rolls 40, and the cam segment 48 take most of the wear which occurs during operation of the device, and all of these parts are readily renewable. Access to them is readily obtained by removal of the die plate 14 from the carrier 18 and removal of the plate 38 from the guide blocks 36.

The main shaft 45 extends downwardly below the table 10 and its lower reduced end 50 is journaled in the bridge wall 7, and held therein by a washer 51.

The shaft 45 carries a one-revolution clutch and worm ring gear, by which it is driven from a driving shaft 55 mounted in bearings in the ribs 6. The driving clutch member 58 is rotatable on the shaft 45—50, is supported from the bridge wall by a thrust bearing, and carries the worm ring gear 57. A worm 56 on the shaft 55 and supported by thrust bearings against the ribs 6, meshes with the ring gear 57 and drives the clutch member 58. The shaft is driven in and suitable way, either through the pulley 54 as shown, or by direct connection to a motor.

The driven clutch member is formed by the shaft 45 itself. To this end, a ring 60 is keyed to the main body of the shaft 45 immediately above the clutch member 58, and a clutch key 62 is carried by, and axially movable in, opposed key-ways in the shaft 45 and ring 60. A spring 63 urges the key 62 downward for engagement with the clutch member 58; and the upper inner edge of the clutch member 58 is provided with one or more notches 66, to receive the clutch key 62. The upper end of the key 62 is provided with a hook 64, and a manually operable cam 68 normally lies in the path of such hook 64 to cam that key 62 upwardly to de-clutched position. A handle 69 is provided by which the cam 68 may be retracted radially, out of the path of the clutch key 62 to permit the spring 63 to move that key to clutching engagement with one of the notches 66 of the clutch member 58.

To prepare the trimmer for use, a lower die 20 suitable for the piece to be trimmed, is mounted on the die plate 14 to move therewith. A stationary filler block 39 shaped to conform to the work piece 75 to be trimmed is mounted above the lower die 20 on the stud 37.

The upper cross head 25 is fitted with a suitable mating die 30 adapted to receive the work piece 75 and to lie in shearing relationship with the lower die 20, and a suitable knock-out block 41 is mounted on the bar 42 within the upper die 30.

The driving motor for the pulley 54 is started, and operates continuously, to continuously rotate the lower clutch member 58. The clutch operating cam 68 is in engagement with the hook 64 of the clutch key 62, holding it in elevated position so that the clutch is disengaged.

The normal at-rest position of the shaft 45 is at a point where its cam segment 48 and its relief 47 lie between the thrust rolls 40 and where all of those thrust rolls 40 engage the cylindrical surfaces of the cam head 46, which positions the die plate 14 in central position. With the die plate 14 and its lower die 20 in such central position, and with the upper cross head 25 raised, a work piece 75 to be trimmed is loaded by placing it in inverted position over the filler block 39 and the lower die 20.

With the piece 75 in loaded position on the lower die 20, the valve 31 is moved to a position at 90° from that shown in Fig. 2, so that air enters the upper end of the cylinder 29 and is discharged from the lower end of the cylinder 29. This lowers the cross head 27 and through the connecting rods 26 draws the upper cross head 25 downward firmly against the stop sleeves 28. In this movement, the upper die 30 moves downward over the piece 75 held on the lower die 20, into shearing relationship with that lower die. With the dies thus closed, the handle 69 is operated to retract the clutch cam 68 from engagement with the clutch key 62, and such key moves into engagement with one of the notches 66, to effect clutch-engagement for one revolution of the shaft 45. During such one-revolution cycle, the cam segment 48 engages the thrust rolls 40 of the four guiding thrust members 34 in circumferential succession. At each such engagement, the relief 47 passes the thrust roll of the diametrically opposite guiding thrust members 34 to permit that member 34 to retract; and the cam segment 48 moves the engaged thrust member 34 radially to the position in which the right-hand thrust member 34 is shown in Fig. 3. Meanwhile, the guiding thrust members 34 at right angles to the direction of movement—the top and bottom ones in Fig. 3—are held in guiding position, with their thrust rolls 40 in engagement with the cylindrical surfaces of the cam head 46, where they guide the carrier 18 and the die plate 14 and die 20 to rectilinear movement radially of the central axis of the shaft 45. Following such outward stroke, the inwardly moved thrust member 34 rides out of the cam-relief, back onto the cylindrical surface of the cam 46, which returns the die plate 14 to center position.

By engagement of the cam segment 48 successively with the four thrust rolls 40, the die plate 14 and lower die 20 are carried through a cycle of four radial movements each including an outward work stroke and an inward return stroke, with the four radial movements at right angles with respect to each other, for example, first to the right, then rearwardly, then to the left, then forwardly.

These four successive radial movements of the lower die 20 effectively shear the walls of the piece 75 to trim that piece to the desired contour.

Upon the completion of each one-revolution cycle, the one-revolution clutch automatically disengages at a point where the thrust rolls 40 all lie on cylindrical surfaces of the cam head 46, so that the lower die is in a central location in alignment with the upper die 30. The air valve 31 is now returned to the position shown in Fig. 2 so that operating air enters the bottom of the cylinder 29 and is discharged from the upper end of the cylinder 29, to raise the cross head 27 and the connected cross head 25. During the upward stroke of the upper cross head 25, the knock out bar 42 engages the stop 43 and is depressed thereby to cause the knock out block to eject the finished piece 75 from the upper die. The trimmed piece and the trim therefrom are removed from the machine and the dies are ready for reloading.

The dies are shown in the drawings as relatively simple shearing dies, but the arrangement of the device and its cycle of operation, in which all die movements are lineal, permits the use of dies or supplementary forming tools of any desired character, to perform operations which may include not only simple shearing operations but may also include banding, slotting, notching, and other operations ordinarily produced in conjunction with trimming operations.

In the machine disclosed, the driving train from the driving shaft 55 through the worm 56, the ring gear 57, the clutch 58—64, and the main shaft 45, to the cam head 46 is short and direct. All its parts are compactly arranged within the mutually reinforcing structure about the center of the table 10, and are supported thereby. Reactions from the varying motions and forces involved in the trimming operation are taken by highly rigid structure, without distortion of the die-supporting parts, and the shearing relationship of the dies is accurately maintained. As a result, the shearing action obtained is of exceptionally high quality, and is maintained over a long life, so that in many cases, supplementary finishing operations are made unnecessary.

I claim as my invention:

1. In a trimming machine having a die carrier translatable through a cycle of shearing movements and providing inwardly presented guiding thrust faces, the combination of a central operating shaft perpendicular to the plane of die movement, a cam head on said shaft within the area defined by said thrust faces, guiding thrust members mounted for radial movement between said cam head and said thrust faces, a renewable cam segment removably mounted in said cam head and adapted to engage said guiding thrust members in circumferential succession, a cam relief to permit retraction of an opposite thrust member, cam surfaces between said cam segment and cam relief to position other thrust members in guiding engagement with their associated thrust faces, and means to drive said shaft and cam head through one-revolution cycles.

2. In a trimming machine having a die carrier translatable through a cycle of shearing movements and providing inwardly presented guiding thrust faces, the combination of a central operating shaft perpendicular to the plane of die movement, a cylindrical cam head on said shaft within the area defined by said thrust faces, guiding thrust members between said cam head and said thrust members, each of said guiding thrust members having an outer surface in guiding engagement with a thrust face on the carrier and having an inner end provided with a part-cylindrical bearing parallel to the axis of said shaft, thrust rolls rotatably received in said bearings in position to engage the cylindrical surface of said cam head when the die carrier is in central position, a single cam segment removably mounted in said cam head, an opposite cam relief, said cam segment and cam relief being positioned to lie between pairs of adjacent thrust rolls when the die carrier is in such central position, and means to drive the shaft and cam head through one-revolution cycles.

3. In a trimming machine having a die carrier translatable through a cycle of shearing movements and providing inwardly presented guiding thrust faces, the combination of a central operating shaft perpendicular to the plane of die movement, a cam head on said shaft within the area defined by said thrust faces, guiding thrust members between said cam head and said thrust faces, guides to hold said thrust members to rectilinear movement, a cam segment and opposite cam relief on said cam head, means to rotate said shaft and head in a single direction, and removable wear plates on said thrust members on the guide-engaging sides thereof which face in the direction of cam rotation.

4. In a trimming machine having a die carrier translatable through a cycle of shearing movements and providing inwardly presented guiding thrust faces, said die carrier including a removable die plate; the combination of a central operating shaft perpendicular to the plane of die movement, guiding thrust members mounted within said thrust faces in abutment therewith, guides at the sides of said thrust members, a cover plate removably mounted above said guides within said carrier and exposed for removal upon removal of the die plate from said carrier, a cam head on said shaft positioned to engage the inner ends of said thrust members, said cam head and thrust members being exposed on removal of said cover plate, a renewable cam segment removably mounted on said cam head, renewable cam-engaging rolls removably carried at the inner ends of said thrust members, and renewable wear plates removably carried by guide-engaging sides of said thrust members, all of such renewable parts being exposed for removal upon removal of said cover plate.

5. In a trimming machine having a die carrier to be translated through a cycle of shearing movements in radial directions from a common central axis and having a rotatable cam on said common axis and thrust members acting between the cam and outwardly positioned portions of the carrier, the combination of a table slidably supporting the carrier, a main shaft supporting the cam and extending through said table, reinforcing walls depending from said table and lying adjacent said shaft and extending outwardly therefrom; a bearing in said table for the upper end of such shaft, a bearing supported from said walls for the lower end of said shaft, a ring gear carried by said shaft, a small gear meshing with said ring gear and mounted in bearings close to said cam shaft in the mutually reinforcing table and wall structure, such gears forming reduction gearing whose reaction is taken by such mutually reinforcing structure, and means to drive said gearing to rotate said shaft through successive shearing cycles.

6. In a trimming machine having a die carrier to be translated through a cycle of shearing movements in radial directions from a common central axis and having a rotatable cam on said common axis and thrust members acting between the cam and outwardly positioned portions of the carrier, the combination of a table slidably supporting the carrier, a main shaft supporting the cam and extending through said table, reinforcing walls depending from said table and lying adjacent said shaft and extending outwardly therefrom; a bearing in said table for the upper end of such shaft, a bearing supported from said walls for the lower end of said shaft, a ring gear rotatably mounted on said shaft, a worm meshing with said ring gear and fixed on a shaft rotatable in bearings carried by such reinforcing walls close to said drive shaft whereby the thrust reaction of said worm is taken by the mutually reinforcing table and wall structure, means to drive said worm shaft, and a one-cycle clutch for clutching said ring gear to said main shaft.

7. In a trimming machine having a die carrier to be translated through a cycle of shearing movements in radial directions from a common central axis and having a rotatable cam on said common axis and thrust members acting between the cam and outwardly positioned portions of the carrier, the combination of a table slidably supporting the carrier, a main shaft supporting the cam and extending through the table, reinforcing walls depending from said table and lying closely adjacent said drive shaft and beneath the carrier supporting portion of said table, means interconnecting said walls adjacent the lower end of said shaft, bearing for said shaft in said table and interconnecting means, a ring gear rototably carried by said shaft between such bearings, a worm meshing with said ring gear and journaled in said walls whereby the thrust reaction thereof is taken by the mutually reinforcing structure of said table and walls, means for driving said worm, and a one-revolution clutch for clutching said ring gear to said shaft.

8. In a trimming machine, the combination as set forth in claim 7 in which the reinforcing walls extend longitudinally of the table and the table is supported adjacent the ends thereof.

9. In a trimming machine having a die carrier to be translated through a cycle of shearing movements in a common plane, a table having a central reinforced structure underlying and slidably supporting the die carrier, a main operating shaft positioned centrally of said die carrier and journaled in the central reinforced structure of said table, a cam head on said shaft, thrust members between said cam head and outward thrust-receiving portions of said die carrier, a support fixed on the central reinforced structure of the table and positioned within the die carrier, a central opening in the die carrier, and a work-piece support mounted on said fixed support through the central opening of said die carrier.

10. In a trimming machine having a die carrier to be translated through a cycle of shearing movements in a common plane, a table having a central reinforced structure underlying and slidably supporting the die carrier, a main operating shaft positioned centrally of said die carrier and journaled in the reinforced central portion of said table, a cam head on said shaft, a ring gear on said main shaft at a point where it is supported by said reinforced central portion of the table, and a worm meshing with said ring gear and mounted in thrust bearings supported by the reinforced central portion of said table.

11. In a trimming machine having a die carrier to be translated through a cycle of shearing movements in a common plane, a table having a central reinforced structure underlying and slidably supporting the die carrier, a main operating shaft positioned centrally of said die carrier and journaled in the reinforced central portion of said table, a cam head on said shaft, a ring gear on said main shaft at a point where it is supported by said reinforced central portion, and speed-reduction gearing in driving engagement with said ring gear and mounted for reaction against said reinforced central portion of the table.

WILLIAM O. HARTUP.

REFERENCES CITED

The following references are of record in the file of this patent:

UNITED STATES PATENTS

| Number | Name | Date |
|---|---|---|
| 452,855 | Sternbergh | May 26, 1891 |
| 1,952,355 | Belshaw | Mar. 27, 1934 |
| 1,965,228 | Gabriel | July 3, 1934 |
| 2,521,974 | Hartup | Sept. 12, 1950 |